(12) United States Patent
Hattori

(10) Patent No.: US 7,354,652 B2
(45) Date of Patent: Apr. 8, 2008

(54) CORROSION-RESISTANT MEMBER AND PRODUCING METHOD THEREOF

(75) Inventor: Akiyoshi Hattori, Handa (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 11/503,807

(22) Filed: Aug. 14, 2006

(65) Prior Publication Data

US 2007/0042203 A1    Feb. 22, 2007

(30) Foreign Application Priority Data

Aug. 18, 2005  (JP) .............................. 2005-237946

(51) Int. Cl.
    *B32B 9/00*    (2006.01)
(52) U.S. Cl. ...................... 428/469; 428/701
(58) Field of Classification Search ............... None
    See application file for complete search history.

(56) References Cited

U.S. PATENT DOCUMENTS

| 4,960,734 | A | * | 10/1990 | Kanai et al. ............... 501/96.4 |
| 5,284,537 | A | * | 2/1994 | Kasori et al. ............. 156/89.27 |
| 6,028,022 | A | * | 2/2000 | Ohashi ....................... 501/152 |
| 6,632,549 | B1 | * | 10/2003 | Ohashi et al. .............. 428/698 |
| 2004/0206273 | A1 | * | 10/2004 | Hermansson et al. ......... 106/35 |

FOREIGN PATENT DOCUMENTS

JP    2003-261396 A1    9/2003

OTHER PUBLICATIONS http://www.answers.com/topic/garnet.*

* cited by examiner

*Primary Examiner*—Jennifer McNeil
*Assistant Examiner*—Jonathan Langman
(74) *Attorney, Agent, or Firm*—Burr & Brown

(57) ABSTRACT

A corrosion-resistant member, which is exposed to a corrosive environment is provided. The corrosion-resistant member is made of a corrosion-resistant material that contains at least one of an oxide of calcium and aluminum, and a calcium aluminum oxide. The corrosion-resistant material includes a rare earth element in an amount of less than 5 wt %.

3 Claims, No Drawings

CORROSION-RESISTANT MEMBER AND PRODUCING METHOD THEREOF

CROSS REFERENCE TO RELATED APPLICATIONS

This application is based upon and claims the benefit of priority from Japanese Patent Application No. 2005-237946 filed on Aug. 18, 2005, the entire contents of which are incorporated herein by reference.

BACKGROUND OF THE INVENTION

1. Field of the Invention

The present invention relates to a corrosion-resistant member and a producing method thereof.

2. Description of the Related Art

The manufacturing process for a semiconductor device and the manufacturing process for a liquid crystal device frequently include processes performed under a corrosive environment. Accordingly, corrosion-resistant members provided with corrosion resistance are used in the manufacturing apparatus of the semiconductor device and a manufacturing apparatus of the liquid crystal device. For example, a corrosion-resistant member made of aluminum nitride, and a corrosion-resistant member in which a surface of the aluminum nitride is coated with an alumina layer, and the like, are used (for example, refer to Japanese Patent Laid-Open Publication No. 2003-261396).

However, in recent years, the corrosive environment in which such a corrosion-resistant member is used has become severe, and the corrosion-resistant member must have a higher corrosion resistance. For example, a corrosion-resistant member that can even resist an environment of halogen-based corrosive gas converted into plasma and a high-temperature corrosive environment has been required.

However, conventional corrosion-resistant members cannot sufficiently cope with the severe corrosive environment in recent years. In particular, in the case of being exposed to the high-temperature corrosive environment, the conventional corrosion-resistant member is corroded. Moreover, in the corrosion-resistant member in which the surface of the aluminum nitride is coated with the alumina layer, while the corrosion resistance thereof is improved by the coating of the alumina layer having a high corrosion resistance, the corrosion resistance of the corrosion-resistant member is still not sufficient.

In connection with this, it is an object of the present invention to provide a corrosion-resistant member having a high corrosion resistance, and to provide a producing method thereof.

SUMMARY OF THE INVENTION

The corrosion-resistant member according to the present invention is characterized in that at least a portion thereof, which is exposed to a corrosive environment, is formed of a corrosion-resistant material containing at least one of an oxide that contains calcium oxide and aluminum oxide, and of calcium aluminum oxide, in which a rare earth element is present in an amount of less than 5 wt %.

A corrosion-resistant material having the above-described composition has extremely excellent corrosion resistance. Therefore, the corrosion-resistant member in which at least the portion thereof which is exposed to the corrosive environment is formed of the corrosion-resistant material can be provided with extremely high corrosion resistance. In the corrosion-resistant member, at least the portion thereof exposed to the corrosive environment needs to be formed of the above-described corrosion-resistant material. Hence, in the corrosion-resistant member, a part thereof may be formed of the above-described corrosion-resistant material, or the entirety thereof may be formed of the above-described corrosion-resistant material.

For example, calcium aluminum oxide can contain at least one of $Ca_{12}Al_{14}O_{33}$ and $Ca_3Al_2O_6$. According to this, the corrosion resistance of the corrosion-resistant member can be further enhanced.

It is preferable that the corrosion-resistant material contains calcium in a ratio of 30 to 80 wt % and aluminum in a ratio of 20 to 70 wt %. According to this, a corrosion-resistant material with a uniform composition can be prepared at a lower temperature.

The corrosion-resistant member can include a base body and a corrosion-resistant layer made of the corrosion-resistant material, which is formed on the base body. According to this, the corrosion resistance of the corrosion-resistant member can be enhanced while making use of characteristics inherent in the base body. For example, due to the fact that the base body has a high thermal conductivity, a corrosion-resistant member including the base body can be provided with high thermal conductivity and high corrosion resistance. Moreover, due to the fact that the base body has a high strength, the corrosion-resistant member including the base body can be provided with high strength and high corrosion resistance.

It is preferable that the thickness of the corrosion-resistant layer be 0.5 to 20 µm. According to this, sufficient corrosion resistance of the corrosion-resistant member can be ensured, and stress caused by a difference between the thermal expansion coefficients of the base body and the corrosion-resistant layer can be reduced.

It is preferable that the average surface roughness (Ra) of the surface of the base body, on which the corrosion-resistant layer is formed, be 0.05 to 2.0 µm. According to this, the adhesion property between the base body and the corrosion-resistant layer can be ensured, and the sufficient corrosion resistance of the corrosion-resistant member can be ensured.

It is preferable that the base body contains aluminum nitride. According to this, the thermal expansion coefficients of the base body and the corrosion-resistant layer can be approximated to each other, and the adhesion property between both the base body and the corrosion-resistant layer can be enhanced. In addition, since the thermal conductivity of aluminum nitride is high, the corrosion-resistant member including the base body that contains aluminum nitride can be provided with a high thermal conductivity and a high corrosion resistance.

The corrosion-resistant member described above can be used for at least one of the manufacture of a semiconductor device and the manufacture of a liquid crystal device.

A method for producing a corrosion-resistant member according to the present invention includes the steps of melting a raw material of a corrosion-resistant material containing at least one of an oxide that contains calcium oxide and aluminum oxide, and calcium aluminum oxide, in which a rare earth element is less than 5 wt %, and cooling the raw material. According to this, a corrosion-resistant member provided with a high corrosion resistance, which is formed of the corrosion-resistant material having excellent corrosion resistance, can be provided.

The raw material of the corrosion-resistant material, which has the above-described composition, can preferably be molten at low temperature of 1500° C. or lower. Therefore, the energy required for producing the corrosion-resistant member can be reduced, and the production costs thereof can be reduced to a large extent. Moreover, in the case of forming the corrosion-resistant layer on the base body, influences such as deformation of the base body and characteristic changes thereof, which are caused by heat that is applied thereto, can be reduced.

Moreover, the above-described raw material is adhered onto a base body, and is molten, thus making it possible to provide a corrosion-resistant member in which the corrosion-resistant layer is formed on the base body.

DETAILED DESCRIPTION OF THE INVENTION

Corrosion-Resistant Member

A corrosion-resistant member according to one embodiment of the present invention is formed from a corrosion-resistant material having excellent corrosion resistance, in which at least a portion thereof which is exposed to a corrosive environment has a specific composition.

The corrosive environment includes, for example, an environment in which a halogen-based corrosive gas, such as a fluorine-based gas and a chlorine-based gas, is present. Moreover, the corrosive environment includes an environment having even higher corrosivity, in which the halogen-based corrosive gas is converted into plasma. Furthermore, the corrosive environment includes an environment having much higher corrosivity, in which the halogen-based corrosive gas and the plasma thereof are present, the environment being held at high temperature.

In the corrosion-resistant member according to this embodiment, at least the portion thereof which is exposed to such a severe corrosive environment needs to contain at least one of (1) an oxide that contains calcium oxide (CaO) and aluminum oxide ($Al_2O_3$), and (2) a calcium aluminum oxide ($Ca_xAl_yO_z$), and needs to be formed of a corrosion-resistant material in which a rare earth element is present in an amount of less than 5 wt %. Hence, in the corrosion-resistant member, a part thereof may be formed of the corrosion-resistant material, or the entirety thereof may be formed of the corrosion-resistant material.

The corrosion-resistant material contains at least one of (1) an oxide that contains the calcium oxide and the aluminum oxide, and of (2) the calcium aluminum oxide. Specifically, the corrosion-resistant material contains at least one of both of the calcium oxide and the aluminum oxide, and of the calcium aluminum oxide as a compound. Therefore, combinations of the oxides contained in the corrosion-resistant material include a combination of the calcium oxide and the aluminum oxide as a first example of combination, the calcium aluminum oxide as a second example of combination, a combination of the calcium aluminum oxide and the calcium oxide as a third example of combination, a combination of the calcium aluminum oxide and the aluminum oxide as a fourth combination, and a combination of the calcium aluminum oxide, the calcium oxide, and the aluminum oxide as a final example of combination.

The amount of the rare earth element contained in the corrosion-resistant material is set at less than 5 wt %. When the rare earth element is contained in the corrosion-resistant material, the melting point of the corrosion-resistant material generally rises. Therefore, as the content of the rare earth element is reduced, the melting point of the corrosion-resistant material drops, which brings an advantage from the viewpoint of the characteristics of the corrosion-resistant material and the producibility of the corrosion-resistant member. For example, in the case where the base body is made of aluminum nitride (AlN), when the melting temperature is as high as 1500° C. or more, there are concerns that a change of volume resistivity, a deterioration of uniform heating performance, and creep deformation may occur in the base body. Moreover, as the melting temperature is rising, the stress caused by the difference between the thermal expansion coefficient of the corrosion-resistant layer and the base body occurs. Accordingly, there is an apprehension of the deterioration of the adhesion property of the corrosion-resistant layer, and exfoliation, cracking and the like of the corrosion-resistant layer. However, in some cases, $Y_2O_3$ or the like, which is generally added as a sintering aid to the AlN and the like of the base body, is somewhat diffused into the corrosion-resistant material, and is contained in the corrosion-resistant material. Accordingly, the amount of rare earth element contained in the corrosion-resistant material is set at less than 5 wt %. It is more preferable that the corrosion-resistant material should not substantially contain a rare earth element.

As described above, the corrosion-resistant material has a specific composition containing at least one of an oxide that contains a calcium oxide and aluminum oxide, and of calcium aluminum oxide, in which the amount of rare earth element is less than 5 wt %, thus making it possible to have the excellent corrosion resistance.

In the case of containing calcium aluminum oxide ($Ca_xAl_yO_z$), for example, the corrosion-resistant material can contain at least one compound of $Ca_{12}Al_{14}O_{33}$ (x=12, y=14, z=33) and $Ca_3Al_2O_6$ (x=3, y=2, z=6) as the calcium aluminum oxide concerned. Specifically, as the calcium aluminum oxide, the corrosion-resistant material may contain only $Ca_{12}Al_{14}O_{33}$, may contain only $Ca_3Al_2O_6$, may contain both $Ca_{12}Al_{14}O_{33}$ and $Ca_3Al_2O_6$, or further, may contain calcium aluminum oxide with a composition other than those of $Ca_{12}Al_{14}O_{33}$ and $Ca_3Al_2O_6$ in addition thereto. According to this, the corrosion resistance of the corrosion-resistant material can be further enhanced.

If the corrosion-resistant material contains at least one oxide that contains calcium oxide and aluminum oxide, and calcium aluminum oxide and the amount of the rare earth element is less than 5 wt %, then the corrosion-resistant material can contain other elements and compounds.

For example, in order to drop the melting point of the corrosion-resistant material, and in order to reduce the difference between the thermal expansion coefficient of the corrosion resistant material and the base body, the corrosion-resistant material can contain an oxide such as an alkaline metal oxide, an alkaline earth metal oxide, and a glass forming material. The glass forming material can include, for example, silica ($SiO_2$), boron oxide ($B_2O_3$), phosphorus oxide ($P_2O_5$), and the like. However, it is preferable that silica ($SiO_2$) is contained in the corrosion-resistant material in an amount of 10 wt % or less in order to maintain the corrosion resistance of the corrosion-resistant material.

Moreover, it is preferable that the total quantity of oxides other than the oxide that contains at least one of the calcium and the aluminum, the oxide being contained in the corrosion-resistant material, is less than 20 wt %. According to this, the corrosion resistance of the corrosion-resistant material can be further enhanced. It is more preferable that the total quantity of the oxides is 10 wt % or less. It is far more preferable that the corrosion-resistant material should not contain oxides other than the oxide that contains at least one of the calcium and the aluminum from a viewpoint of the corrosion resistance.

With regard to the remaining components excluding oxygen, it is preferable that the corrosion-resistant material contains calcium in a ratio of 30 to 80 wt % and aluminum in a ratio of 20 to 70 wt % (total of both is 100 wt % or less). According to such a compound ratio of the calcium and the aluminum, a corrosion-resistant material with a uniform composition can be prepared at lower temperature. With regard to the remaining components excluding the oxygen, it is more preferable that the corrosion-resistant material contain calcium in a ratio of 45 to 70 wt % and aluminum in a ratio of 30 to 55 wt % (total of both is 100 wt % or less).

The corrosion-resistant member partially formed of the corrosion-resistant material can include a base body and a corrosion-resistant layer of the corrosion-resistant material, which is formed on a surface of the base body. According to this, the corrosion resistance of the corrosion-resistant member can be enhanced by the corrosion-resistant material while making use of the characteristics inherent in the base body. For example, due to the fact that the base body has high thermal conductivity, a corrosion-resistant member including the base body can be provided with high thermal conductivity and a high corrosion resistance. Moreover, due to the fact that the base body has a high strength, a corrosion-resistant member including the base body can be provided with a high strength and a high corrosion resistance.

The material of the base body is not limited. The base body needs to be capable of supporting the corrosion-resistant layer, and needs to be provided with heat resistance for resisting heating when the corrosion-resistant layer is formed. It is preferable that the base body has a thermal expansion coefficient approximate to that of the corrosion-resistant layer. It is preferable that the difference between the thermal expansion coefficient of the base body and the corrosion-resistant layer be $6.0 \times 10^{-6}$/K or less.

Moreover, for example, when the thermal conductivity of the base body is desired to be enhanced, the base body can contain aluminum nitride, silicon carbide, and the like.

In particular, it is preferable that the base body contains aluminum nitride. According to this, the thermal expansion coefficients of the base body and the corrosion-resistant layer can be approximated to each other, and the adhesion property between both of the base body and the corrosion-resistant layer can be enhanced. In addition, since thermal conductivity of the aluminum nitride is high, the corrosion-resistant member can be provided with high thermal conductivity and high corrosion resistance. In the case of using an aluminum nitride sintered body as the base body, preferably, the purity of the aluminum nitride sintered body is, for example, 85 wt % or more, and more preferably, 90 wt % or more.

Moreover, it is preferable that average surface roughness (Ra) (JIS B0601) of the surface of the base body, on which the corrosion-resistant layer is formed, is 0.05 to 2.0 μm. The average surface roughness (Ra) of the surface is set at 0.05 μm or more, thus making it possible to ensure the adhesion property between the base body and the corrosion-resistant layer. The average surface roughness (Ra) is set at 2.0 μm or less, thus making it possible to ensure sufficient corrosion resistance of the corrosion-resistant member. It is more preferable that the average surface roughness (Ra) is 0.1 to 1.2 μm.

Furthermore, it is preferable that the thickness of the corrosion-resistant layer is 0.5 to 20 μm. The thickness of the corrosion-resistant layer is set at 0.5 μm or more, thus making it possible to ensure sufficient corrosion resistance of the corrosion-resistant layer. The thickness of the corrosion-resistant layer is set at 20 μm or less, thus making it possible to reduce stress caused by the difference between the thermal expansion coefficient of the base body and the corrosion-resistant layer. Hence, for example, the corrosion-resistant layer can be prevented from being peeled off from the base body and becoming a source of particles, as in the case where the thickness of the corrosion-resistant layer exceeds 20 μm. It is more preferable that the thickness of the corrosion-resistant layer is 1 to 10 μm.

The corrosion-resistant member described above can be used for various purposes such as in the manufacture of the semiconductor device and in the manufacture of the liquid crystal device, in which corrosion resistance is required. For example, the corrosion-resistant member can be used as an electrostatic chuck and a susceptor, each of which holds a substrate such as a semiconductor wafer and a liquid crystal substrate, a heater which holds and heats up the substrate, and further, a ring and a straightening vane. In the case of using the corrosion-resistant member as the electrostatic chuck or the susceptor, the corrosion-resistant member includes electrodes. In the case of using the corrosion-resistant member as the heater, the corrosion-resistant member includes a resistant heating body.

In particular, when the corrosion-resistant member is a corrosion-resistant member in which the corrosion-resistant layer is formed on the base body containing aluminum nitride, the corrosion-resistant member is provided with high corrosion resistance and high thermal conductivity. Accordingly, in the case of using the corrosion-resistant member as an electrostatic chuck, a susceptor, a heater, or the like, not only is the corrosion-resistant member not corroded, but also the temperature of the substrate can be uniformly maintained.

Producing Method

The corrosion-resistant member described above can be produced by melting, cooling and solidifying a raw material of the corrosion-resistant material containing at least one of an oxide that contains the calcium oxide and the aluminum oxide, and the calcium aluminum oxide, in which the amount of the rare earth element is less than 5 wt %.

First, the raw material is prepared. For the raw material, there may be used compounds which generate the calcium oxide, the aluminum oxide, and the calcium aluminum oxide, that is, a source of calcium oxide, a source of aluminum oxide, a source of calcium aluminum oxide, and the like. Alternatively, calcium oxide, aluminum oxide, and calcium aluminum oxide may be directly used.

For example, a calcium compound such as the calcium oxide, calcium carbide ($CaCO_3$), and calcium hydroxide ($Ca(OH)_2$) and an aluminum compound such as the aluminum oxide and aluminum hydroxide ($Al(OH)_3$) are weighed and mixed together, and the raw material is thereby prepared. A mixture of the calcium compound and the aluminum compound becomes the source of the calcium aluminum oxide. Moreover, the calcium compound also serves as the source of the calcium oxide, and the aluminum compound also serves as the source of the aluminum oxide.

With regard to these compounds, it is preferable to obtain the raw material of the corrosion-resistant material by weighing and mixing the calcium and the aluminum so that mass ratios of the calcium and the aluminum in the raw material can be 30 to 80 wt % and 20 to 70 wt %, respectively. According to this, the corrosion-resistant material with the uniform composition can be prepared at the lower temperature.

Moreover, according to needs, the compounds which generate the compoundable oxides such as the alkaline metal oxide, the alkaline earth metal oxide, and the glass forming material may also be weighed and mixed. As the compounds which generate oxides such as the alkaline metal oxide, the alkaline earth metal oxide, and the glass forming material, there can be used hydroxides, oxides, and the like of elements contained in the alkaline metal, the alkaline earth metal, and the glass forming material.

In the case of producing the corrosion-resistant member in which the corrosion-resistant layer is formed on the base body, for example, the raw material is adhered onto the base body, followed by melting and cooling. The raw material needs to be adhered onto a portion of the base body on which the corrosion-resistant layer is desired to be formed. In this case, though the above-described raw material can be directly used, it is preferable to use the one obtained by melting the raw material once, followed by homogenization. Specifically, the raw material is molten once and cooled, followed by pulverization, and powder thus obtained is prepared. It is preferable that the raw material thus pulverized into the powder through such a process as described above be adhered onto the base body. According to this, a more uniform corrosion-resistant layer can be formed. It is preferable that a mean particle diameter of the raw material in the powder form be 10 to 50 μm. For the raw material, for example, the one molten at 1400 to 1600° C. can be used.

In order to adhere the raw material onto the base body, for example, a solution in which the raw material is mixed with a solvent or a paste in which the raw material is mixed with a binder is prepared. Next, the raw material can be adhered onto the base body in such a manner that the solution or the paste is coated on the base body by brushing, that the solution or the paste is sprayed onto the base body by using a spray and the like, that the base body is immersed into the solution or the paste, followed by raising (dipping), or that the paste is printed on the base body by screen printing and the like. For the binder, polyvinyl alcohol (PVA) and the like can be used.

Alternatively, the base body is housed in a forming die, the powder raw material form is filled onto the base body, and the raw material may thereby be adhered onto the base body. Alternatively, the raw material is thermally sprayed onto the base body, and the raw material may thereby be adhered onto the base body. In this case, it is preferable to thermally spray the raw material formed into the powder by being molten once.

It is preferable to adjust in advance the average surface roughness (Ra) (JIS B0601) of the surface of the base body, on which the corrosion-resistant layer is formed, at 0.05 to 2.0 μm. It is more preferable to adjust in advance the average surface roughness (Ra) at 0.1 to 1.2 μm. For example, the surface of the base body is mechanically processed using a surface grinder, a high-speed lapping machine, and the like, thus making it possible to adjust the average surface roughness in the above-described range.

Next, the raw material is heated up and molten in a state where the raw material is adhered onto the base body. The melting temperature is not limited as long as it is equal to or higher than temperature at which the raw material is molten; however, it is preferable to set the melting temperature at 1500° C. or lower. The raw material of the corrosion-resistant material, which has the above-described composition, can be molten at the low temperature of 1500° C. or lower. Therefore, energy required for producing the corrosion-resistant member can be reduced, and production cost thereof can be reduced to a large extent. Moreover, such influences as a deformation of the base body and a characteristic change thereof, which are caused by that heat is applied thereto, can be reduced. It is more preferable that the melting temperature be 1400 to 1500° C.

The melting of the raw material can be performed, for example, in an inert gas atmosphere of nitrogen gas, argon gas, and the like, and in a reduced-pressure atmosphere. The melting time can be set, for example, at 0.1 to 2.0 hours. Moreover, it is preferable to set a temperature rise rate at 0.5 to 10.0° C./min to the melting temperature. When the temperature rise rate is less than 0.5° C./min, there is a possibility that the raw material is crystallized to raise a melting point thereof, thereby bringing a rise of the melting temperature. The temperature rise rate is set at 10.0° C./min or less, thus making it possible to prevent breakage of the corrosion-resistant member.

The raw material is molten as described above, followed by the cooling, thus making it possible to obtain the corrosion-resistant member in which the corrosion-resistant layer is formed on the base body. It is preferable to set a temperature drop rate at 1 to 10° C./min to room temperature. When the temperature drop rate is less than 1° C./min or less, this takes too long time, and is not economic. The temperature drop rate is set at 10° C./min or less, thus making it possible to prevent an occurrence of a crack.

Meanwhile, in the case of producing the corrosion-resistant member entirely formed of the corrosion-resistant material, the raw material is molten and poured into the forming die, followed by the cooling, thus making it possible to obtain a corrosion-resistant member with a predetermined shape. Alternatively, the raw material in the powder form can be filled into the forming die, heated, and molten, followed by the cooling. In this case, the raw material in the powder form and the binder such as the polyvinyl alcohol (PVA) may also be mixed together, and a mixture thus obtained may also be filled into the forming die.

Also in the case of producing the corrosion-resistant member as described above, which is entirely formed of the corrosion-resistant material, melting and cooling conditions for the raw material, that is, the melting temperature, the atmosphere, the melting time, the temperature rise rate, the temperature drop rate, and the like, can be set similar to those in the above-described case of forming the corrosion-resistant layer on the base body.

As described above, according to the corrosion-resistant member and the producing method thereof in accordance with this embodiment, at least the portion thereof exposed to the corrosive environment can be formed of the corrosion-resistant material which has the specific composition and is extremely excellent in corrosion resistance. Hence, a corrosion-resistant member having extremely high corrosion resistance can be provided.

Accordingly, there can be provided a corrosion-resistant member capable of resisting even a severe environment such as an environment in which the halogen-based corrosive gas is converted into the plasma, and an environment in which the halogen-based corrosive gas is converted into the plasma, further held at the high temperature. Hence, the corrosion-resistant member according to this embodiment can sufficiently resist even a process (for example, a cleaning process) under such a high-temperature corrosive environment in which the conventional corrosion-resistant member made of the aluminum nitride is corroded and portions peeled off therefrom become the particles.

EXAMPLES

Next, a description will be made of the present invention in far more detail by using examples; however, the present invention is never limited to the examples to be described below.

Example 1

5 wt % yttrium oxide was added as a sintering aid to 95 wt % aluminum nitride powder, and was mixed therewith by using a ball mill. A binder was added to mixed powder thus obtained, and a slurry was prepared. The slurry was granulated into a powder by a spray granulation method. The powder thus granulated was formed into a plate shape by a die molding method. The plate-like formed body thus obtained was sintered at 1860° C. for 6 hours in nitrogen gas using a hot press method. The aluminum nitride sintered body thus obtained was mechanically processed by using a surface grinder. In such a way, a base body of the aluminum nitride sintered body was produced, having a size of 15 mm square, a thickness of 1 mm, and an average surface roughness (Ra) of the surface of 0.8.

Next, with regard to the raw material of the corrosion-resistant material, calcium carbonate and aluminum hydroxide were weighed and mixed together so that the weight percent of the calcium carbonate could be 54 wt % in conversion to the calcium oxide, and so that the weight percent of the aluminum hydroxide could be 46 wt % in conversion to aluminum oxide, and the raw material was thus prepared. The prepared raw material was molten at 1450° C., and cooled. Thereafter, the raw material was pulverized, and the raw material in the powder form was thus prepared. The prepared powder raw material and polyvinyl alcohol (PVA) were mixed together, and a paste was produced. The paste was printed on the base body by the screen printing to a thickness of 10 μm, and the raw material was adhered onto the entire surface of the base body, thereby coating the base body entirely. The paste (containing the raw material) coated on the base body was heated at 500° C. for 10 hours in the atmosphere, and thus was degreased.

Then, the raw material thus processed was held at the melting temperature of 1450° C. for 2 hours in the nitrogen gas, and thus was molten. The temperature rise rate was set at 3.3° C./min. After being molten (and being held for 2 hours), the raw material was cooled to the room temperature at the temperature drop rate of 3.3° C./min. In such a way, a corrosion-resistant layer with a thickness of 5 μm was formed on the base body of the aluminum nitride sintered body, and a corrosion-resistant member entirely coated with the corrosion-resistant layer was produced.

Example 2

With regard to the raw material of the corrosion-resistant material, calcium carbonate and aluminum hydroxide were weighed and mixed together so that the weight percent of the calcium carbonate could be 51 wt % in conversion to the calcium oxide, and so that the weight percent of the aluminum hydroxide could be 49 wt % in conversion to the aluminum oxide, and the raw material was thus prepared.

The raw material thus processed was held at the melting temperature of 1500° C. for 2 hours in the nitrogen gas, and thus was molten. The temperature rise rate was set at 5° C./min. Then, the molten raw material was poured into a casting mold made of a refractory, and was cooled to the room temperature at a temperature drop rate of 5° C./min. In such a way, a corrosion-resistant member entirely formed of the corrosion-resistant material was prepared, having a size of 15 mm square, and a thickness of 1 mm.

Example 3

With regard to the raw material of the corrosion-resistant material, calcium carbonate and the aluminum hydroxide were weighed and mixed together so that the weight percent of the calcium carbonate could be 54 wt % in conversion to calcium oxide, and so that the weight percent of the aluminum hydroxide could be 46 wt % in conversion to aluminum oxide, and the raw material in the powder form was thus prepared. The raw material and the polyvinyl alcohol were mixed together, and a mixture thus obtained was filled into a plaster mold. The plaster mold was housed in an electric furnace, and held at the melting temperature of 1500° C. for 2 hours, and the raw material was thus molten. An atmosphere in the electric furnace was set as the atmosphere. The temperature rise rate was set at 5° C./min. After being molten, the raw material was cooled to room temperature at a temperature drop rate of 5° C./min. In such a way, a corrosion-resistant member entirely formed of the corrosion-resistant material was prepared, having a size of 15 mm square, and a thickness of 1 mm.

Comparative Examples 1 and 2

For comparison, an aluminum nitride sintered body (Comparative example 1) and an aluminum oxide sintered body (Comparative example 2) were prepared, each having a size of 15 mm square, and a thickness of 1 mm.

[Evaluation]

$NF_3$ gas at 0.1 Torr was introduced into a reaction container, and was excited to be converted into plasma. The corrosion-resistant members of Examples 1 to 3, the aluminum nitride sintered body of Comparative example 1, and the aluminum nitride sintered body of Comparative example 2 were housed in the reaction container. Then, the inside of the reaction container was heated up to 550° C. and held for 5 hours, and a corrosion resistance test was performed. The weights of the above-described corrosion-resistant members were measured before and after the corrosion-resistant test, and the loss in each of the weights ($mg/cm^2$) due to corrosion was obtained. Then, the weight loss of the aluminum nitride was taken as 1.0, and a ratio of the weight loss of each corrosion-resistant member with respect to the weight loss of the aluminum nitride was obtained.

Moreover, the crystal phases of the corrosion-resistant layer of Example 1 and of the corrosion-resistant members of Examples 2 and 3 were analyzed by an X-ray diffraction analysis method, and the calcium content, aluminum content, and rare earth element content of each thereof were analyzed by an energy dispersion spectroscopy (EDS: JED-2200 made by JEOL Ltd.). Thus, the composition of each was analyzed. The results of the analysis are shown in Table 1.

TABLE 1

|  |  | Example 1 | Example 2 | Example 3 | Comparative example 1 | Comparative example 2 |
|---|---|---|---|---|---|---|
| Crystal phase | | $Ca_{12}Al_{14}O_{33}$ + $Ca_3Al_2O_6$ | $Ca_{12}Al_{14}O_{33}$ + $Ca_3Al_2O_6$ | $Ca_{12}Al_{14}O_{33}$ + $Ca_3Al_2O_6$ | AlN | $Al_2O_3$ |
| Element content (wt%) | Ca | 67 | 63 | 66 | — | — |
| | Al | 30 | 37 | 34 | — | — |
| | Rare earth | 3 | 0 | 0 | — | — |
| Weight loss ratio[*1] | | 0.2 | 0.2 | 0.2 | 1.0 | 0.6 |

[*1]Ratio of weight loss with respect to weight loss of aluminum nitride (weight loss of aluminum nitride is taken as 1.0)

Each of the corrosion-resistant layer of Example 1 and the corrosion-resistant members of Examples 2 and 3 contained the calcium aluminum oxide, in which the rare earth element content was less than 5 wt %. Moreover, each weight loss ratio of Examples 1 to 3 was restricted to ⅕ of the aluminum nitride sintered body of Comparative example 1, and was ⅓ even in comparison with the weight loss ratio of the aluminum nitride sintered body of Comparative example 2. As described above, in each of the corrosion-resistant layer of Example 1 and the corrosion-resistant members of Examples 2 and 3, the corrosion thereof was extremely small. Hence, it was confirmed that the corrosion-resistant members of Examples 1 to 3 had such a high corrosion resistance that could resist even the plasma environment of a high-temperature halogen-based corrosive gas.

What is claimed is:

1. A corrosion-resistant member exposed to a corrosive environment comprising:

a base body comprising aluminum nitride and having an average surface roughness of 0.05-2.0 μm on an outer surface thereof; and a corrosion-resistant layer having a thickness of 0.5-20 μm provided on the entire outer surface of the base body and being made of a corrosion-resistant material including 30-80 wt % calcium and 20-70 wt % aluminum, the corrosion-resistant material comprising at least one of (1) an oxide containing calcium oxide and aluminum oxide and (2) a calcium aluminum oxide, and not more than 3 wt % of a rare earth element.

2. The corrosion-resistant member according to claim 1, wherein the calcium aluminum oxide comprises at least one of $Ca_{12}Al_{14}O_{33}$ and $Ca_3Al_2O_6$.

3. The corrosion-resistant member according to claim 1, wherein the corrosion-resistant member is used for at least one of manufacture of a semiconductor device and manufacture of a liquid crystal device.

* * * * *